(12) United States Patent
Chen et al.

(10) Patent No.: US 11,016,030 B2
(45) Date of Patent: May 25, 2021

(54) DETECTION METHOD AND DETECTION DEVICE WITH COMPENSATION FUNCTION

(71) Applicant: DELTA ELECTRONICS, INC., Taoyuan (TW)

(72) Inventors: Ying-Ting Chen, Taoyuan (TW); Peng-Hsiang Wu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 258 days.

(21) Appl. No.: 16/172,033

(22) Filed: Oct. 26, 2018

(65) Prior Publication Data

US 2019/0128814 A1 May 2, 2019

Related U.S. Application Data

(60) Provisional application No. 62/577,352, filed on Oct. 26, 2017.

(30) Foreign Application Priority Data

Oct. 15, 2018 (CN) .......................... 201811197588.9

(51) Int. Cl.
| | |
|---|---|
| *G01N 21/78* | (2006.01) |
| *G01N 35/00* | (2006.01) |
| *G01N 21/84* | (2006.01) |
| *G01N 21/77* | (2006.01) |

(52) U.S. Cl.
CPC ......... *G01N 21/78* (2013.01); *G01N 21/8483* (2013.01); *G01N 35/00584* (2013.01); *G01N 35/00693* (2013.01); *G01N 2021/7759* (2013.01); *G01N 2035/0097* (2013.01); *G01N 2035/00702* (2013.01)

(58) Field of Classification Search
CPC . G01N 2021/7759; G01N 2035/00702; G01N 2035/00594; G01N 2035/00693; G01N 2035/0097; G01N 21/78; G01N 21/8483; G01N 21/8494; G01N 35/00584; G01N 35/00594; G01N 35/00693
USPC .......... 436/63, 164, 165, 169; 422/400, 402, 422/420, 82.05, 82.09
See application file for complete search history.

(56) References Cited

U.S. PATENT DOCUMENTS

| | | | | |
|---|---|---|---|---|
| 6,448,067 | B1 * | 9/2002 | Tajnafoi | G01N 21/8483 356/39 |
| 10,161,877 | B2 * | 12/2018 | Lin | G01N 21/8483 |
| 10,605,741 | B2 * | 3/2020 | Lu | G06K 9/4647 |

(Continued)

*Primary Examiner* — Maureen Wallenhorst
(74) *Attorney, Agent, or Firm* — Muncy, Geissler, Olds & Lowe, P.C.

(57) ABSTRACT

A detection method with a compensation function includes the following steps. After a sample is added to a first cassette, a first triggering instruction is provided to define a first time point. The start position of the reaction area of the first cassette is detected, and a second time point is defined when a first light detecting signal greater than or equal to a predetermined value is obtained. After a predetermined time, a second light detecting signal is obtained from a color band of the reaction area. The time difference between the first time point and the second time point is calculated and the time difference is designated as a first retention time. A compensation value is obtained in a lookup table according to the first retention time and the second detecting signal and the second detecting signal is compensated by the compensation value.

13 Claims, 13 Drawing Sheets

(56) References Cited

U.S. PATENT DOCUMENTS

2014/0248717 A1* 9/2014 Nazareth ............ G01N 21/8483
436/510
2016/0139156 A1* 5/2016 Lakdawala ........ G01N 21/8483
435/7.92

* cited by examiner

When any one of the plurality of third light detecting signals within the predetermined time from the plurality of fourth time points is less than the predetermined value, generating an abnormal message and deleting one of the fourth light detecting signals corresponding to the one of the third light detecting signals ~S712

DETECTION METHOD AND DETECTION DEVICE WITH COMPENSATION FUNCTION

CROSS REFERENCE TO RELATED APPLICATIONS

This application claims priority of U.S. Provisional Application No. 62/577,352, filed Oct. 26, 2017, and China Patent Application No. 201811197588.9, filed on Oct. 15, 2018, the entirety of which is incorporated by reference herein.

BACKGROUND OF THE INVENTION

Field of the Invention

The present invention relates to a detection method and detection device, and in particular it relates to a detection method and detection device with a compensation function.

Description of the Related Art

Lateral flow assay technology is easy to use and mature in process technology, and is widely used in rapid test products. Lateral flow strips mainly consists of a sample pad, a colloidal gold pad, a nitrocellulose membrane and an absorption pad. The lateral flow test strip may be designed with the cassette, and the above layers of materials are fixed and formed into a sample opening on the cassette which the user can use to add the sample. After the test sample is added into the sample opening of the cassette, the test sample may flow on the lateral test strip to the nitrocellulose membrane, and then the test sample reacts with the nitrocellulose membrane to generate different color changes, so that the user may know the detection state of the test sample through the color change.

However, the flow speed of the test sample in the test cassette may affect the reaction result of the test sample and the nitrocellulose membrane, such that the detection state of the test sample may be affected, leading to misjudgment. Therefore, how to effectively improve the accuracy of testing has become the focus for technical improvements by various manufacturers.

BRIEF SUMMARY OF THE INVENTION

The present invention is to provide a detection method and a detection device with a compensation function, thereby improving the accuracy of testing and decreasing the probability of misjudgment.

The present invention provides a detection method with a compensation function that includes the following steps. After a sample is added to a first cassette, a first triggering instruction is provided to define a first time point. The start position of the reaction area of the first cassette is detected, and a second time point is defined when a first light detecting signal greater than or equal to a predetermined value is obtained. After a predetermined time, a second light detecting signal is obtained from a color band of the reaction area. The time difference between the first time point and the second time point is calculated and the time difference is designated as a first retention time. A compensation value is obtained in a lookup table according to the first retention time and the second detecting signal and the second detecting signal is compensated by the compensation value.

In addition, the present invention provides a detection device with a compensation function, which includes a first cassette, a triggering unit, a light source unit, a detecting unit and a processing unit. The first cassette is configured to add a sample, such that the sample flows to the reaction area of the first cassette. The triggering unit is configured to generate a first triggering instruction after the sample is added to the first cassette. The light source unit is configured to provide a light beam for illuminating the reaction area. The detecting unit, configured to correspond to the reaction area, wherein when the sample flows to the start position of the reaction area, the detecting unit detects the start position to generate a first light detecting signal, and after the sample flows to the reaction area from the start position for a predetermined time, a color band is generated in the reaction area, the detecting unit detects the color band to generate a second light detecting signal. The processing unit is coupled to the triggering unit, the light source unit and the detecting unit, wherein the processing unit receives the first triggering instruction to define a first time point, the processing unit receives the first light detecting signal, defines a second time point when the first light detecting signal is greater than or equal to the predetermined value and calculates the time difference between the first time point and the second time point and designates the time difference as a first retention time, the processing unit receives the second light detecting signal and obtains a compensation value in a lookup table according to the first retention time and the second detecting signal and compensates for the second detecting signal by the compensation value.

According to the detection method and detection device with a compensation function, the sample is added to the first cassette, the start position and the color band of the reaction area of the first cassette is detected to generate the first light detecting signal and the second light detecting signal, respectively. Then, the first time pointed is defined according to the first triggering instruction and the second time point is defined when the first light detecting signal is greater than or equal to the predetermined value, and the time difference between the first time point and the second time point is calculated and the time difference is designated as the first retention time. Afterward, the corresponding compensation value is obtained in the lookup table according to the first retention time and the second light detecting signal, so as to compensate for the second light detecting signal. Therefore, the test data generated by the first cassette is more accurate and the probability of incorrect detection is decreased.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents the same or similar element or component.

Figure 1A:
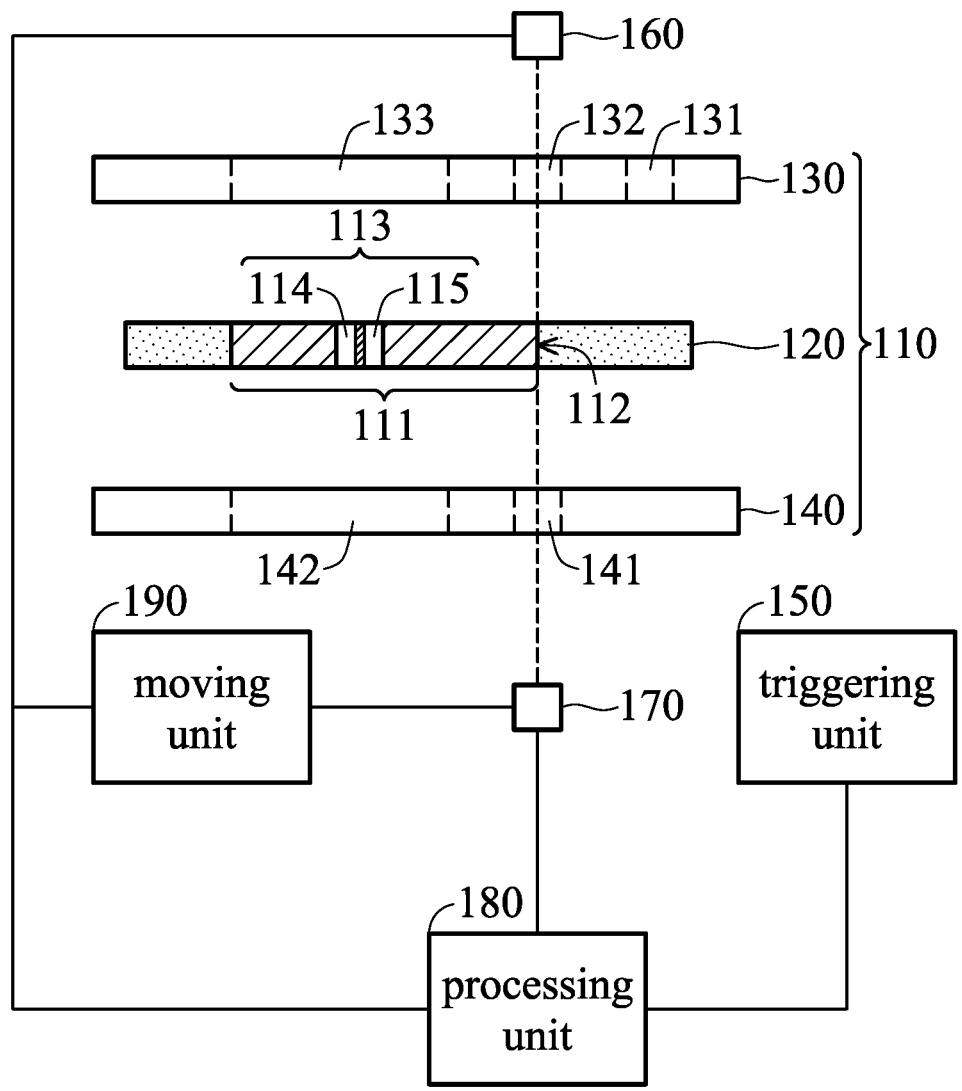
FIG. 1A shows a schematic view of a detection device with a compensation function according to an embodiment of the present invention.
Figure 1B:
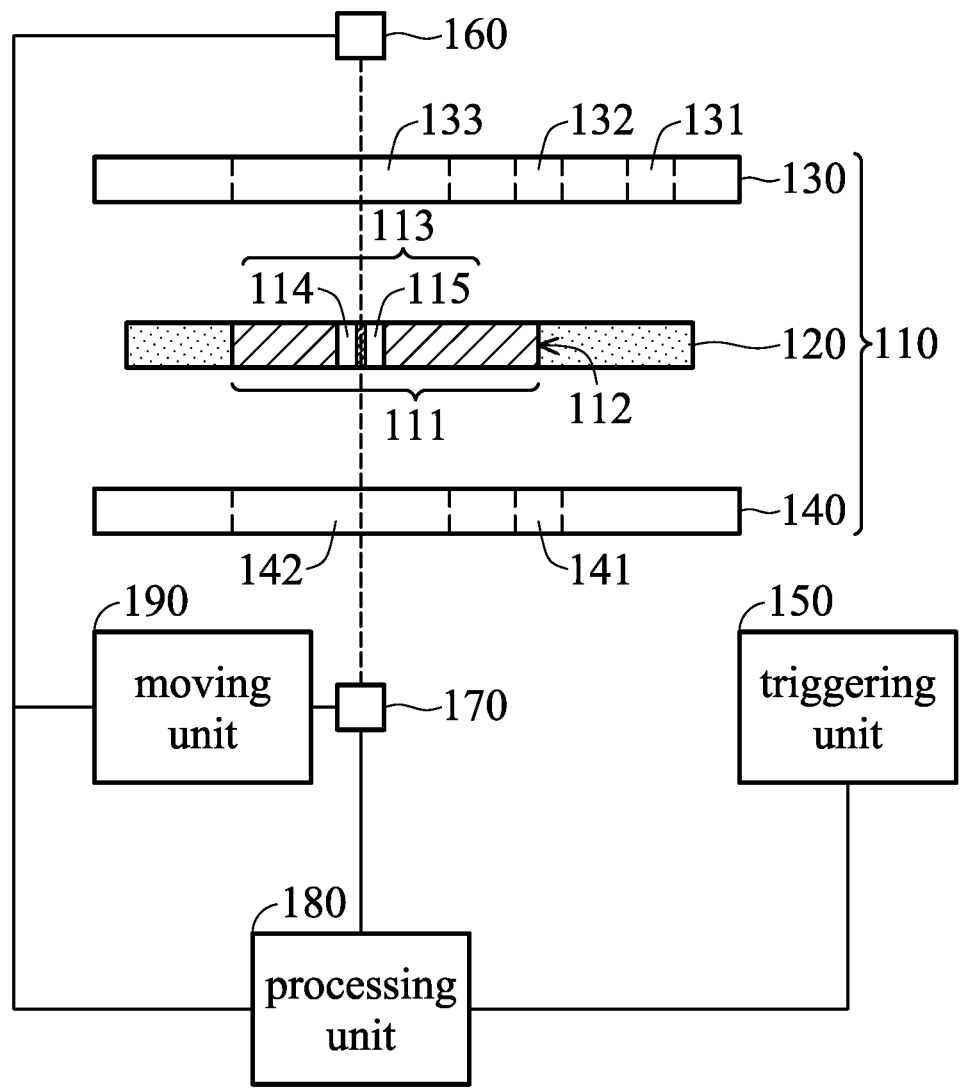
FIG. 1B shows a schematic view of a detection device with a compensation function according to another embodiment of the present invention.

FIG. 1A shows a schematic view of a detection device with a compensation function according to an embodiment of the present invention. FIG. 1B shows a schematic view of a detection device with a compensation function according to another embodiment of the present invention. Please refer to FIG. 1A and FIG. 1B, a detection device with a compensation function 100 includes a first cassette 110, a triggering unit 150, a light source unit 160, a detecting unit 170 and a processing unit 180. The processing unit 180 is coupled to the triggering unit 150, the light source unit 160 and the detecting unit 170.

The first cassette 110 is configured to accommodate a sample. The sample lateral added in the first cassette 110 may laterally flow to a reaction area 111 (such as a slash portion as shown in figure) of the first cassette 110. In the embodiment, the first cassette 110 is, for example, a lateral flow assay test cassette, and used to the detecting application for physiological metabolites or pathogens, such as cardiac troponin-I or luteinizing hormone. The sample includes, for example, blood, urine, or other liquid sample.

In addition, the reaction area 111 includes, for example, nitrocellulose membrane. An analyte (antigen) in the sample is combined with the colloidal gold-detection antibody conjugation in the colloidal gold pad of the first cassette 110. Then, the analyte flows along the reaction area 111 and is aggregately combined with the capture antibody on at least two color bands 113 (such as a test band 114 and a quality control band 115) to appear a color change for detection.

The triggering unit 150 is configured to generate a first triggering instruction after the sample is added to the first cassette 110. In the embodiment, the triggering unit 150 is configured on a case of the detection device 100. After the first cassette 110 is inserted into the detection device and the sample is added, the user may press the triggering unit 150, such as a button (not shown), to generate the first triggering instruction.

In some embodiment, the triggering unit 150 is, for example, a physical detector, and the triggering unit 150 may be configured in the case of the detection device 100. When the user adds the sample to the first cassette 110 and places and fixes the first cassette 110 on a tray, the tray enters a particular position within the case of the detection device 100 along a slide rail (not shown) to touch the triggering unit 150, such that the triggering unit 150 generates the first instruction.

In some embodiments, the triggering unit 150 is, for example, a detector, and the triggering unit 150 may be configured at the sample adding position of the first cassette 110. After the first cassette 110 is inserted into the detection device 100 and the sample is added, the triggering unit 150 may detect the sample to generate the first instruction.

The light source unit 160 is configured to provide a light beam and the light beam illuminates the start position 112 and the color band 113 of the reaction area 111 of the first cassette 110. The light source 160 may be, for example, a light-emitting diode or another lighting device.

The detecting unit 170 is configured to correspond to the reaction area 111 of the first cassette 110, detect the light transmitting state or light reflecting state of the start position 112 and the light transmitting state or light reflecting state of the color band 113, so as to obtain a first light detecting signal and a second light detecting signal. In the embodiment, the light source 160 and the detecting unit 170 may be configured in a opposite manner, i.e. the detecting unit 170 is configured opposite to the light source unit 160. In other words, the light source unit 160 and the detecting unit 170 are respectively configured on the front and back sides of the first cassette 110. When the light beam provided by the light source unit 160 penetrates the reaction area 110 to the detecting unit 170 on the back side of the first cassette 110, the detecting unit 170 generates the first light detecting signal and the second light detecting signal.

Figure 1C:
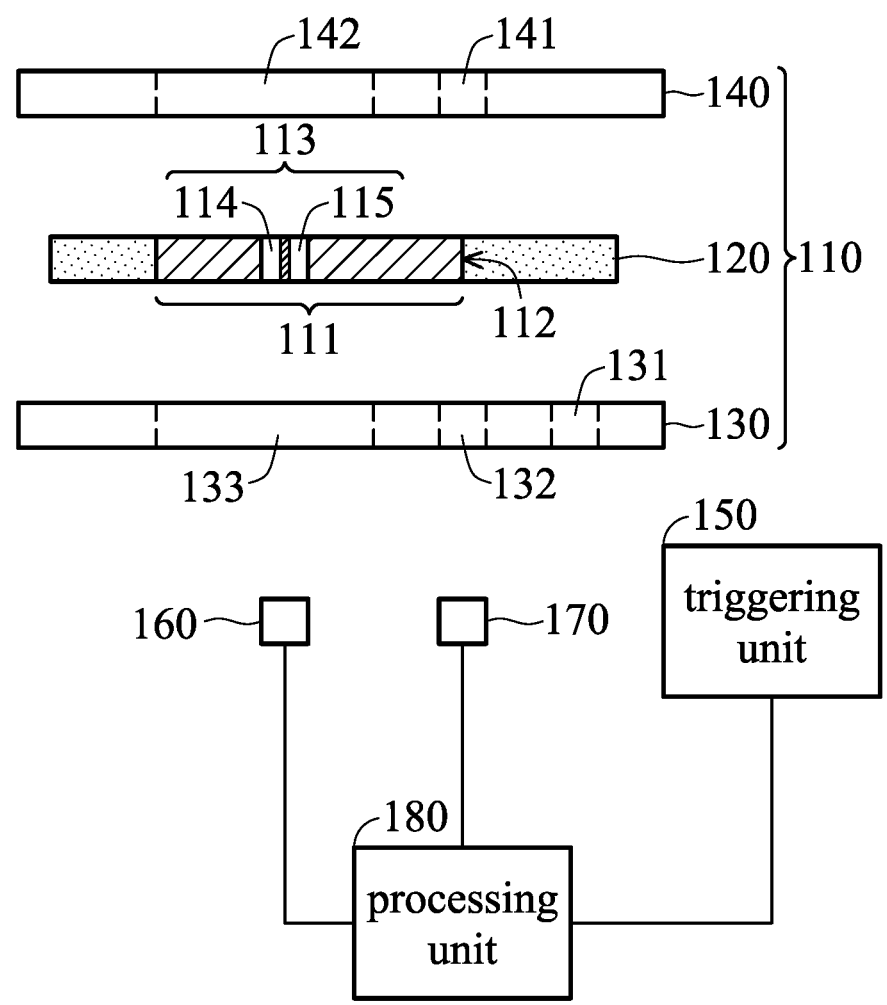
FIG. 1C shows a schematic view of a detection device with a compensation function according to yet another embodiment of the present invention.
Figure 1D:
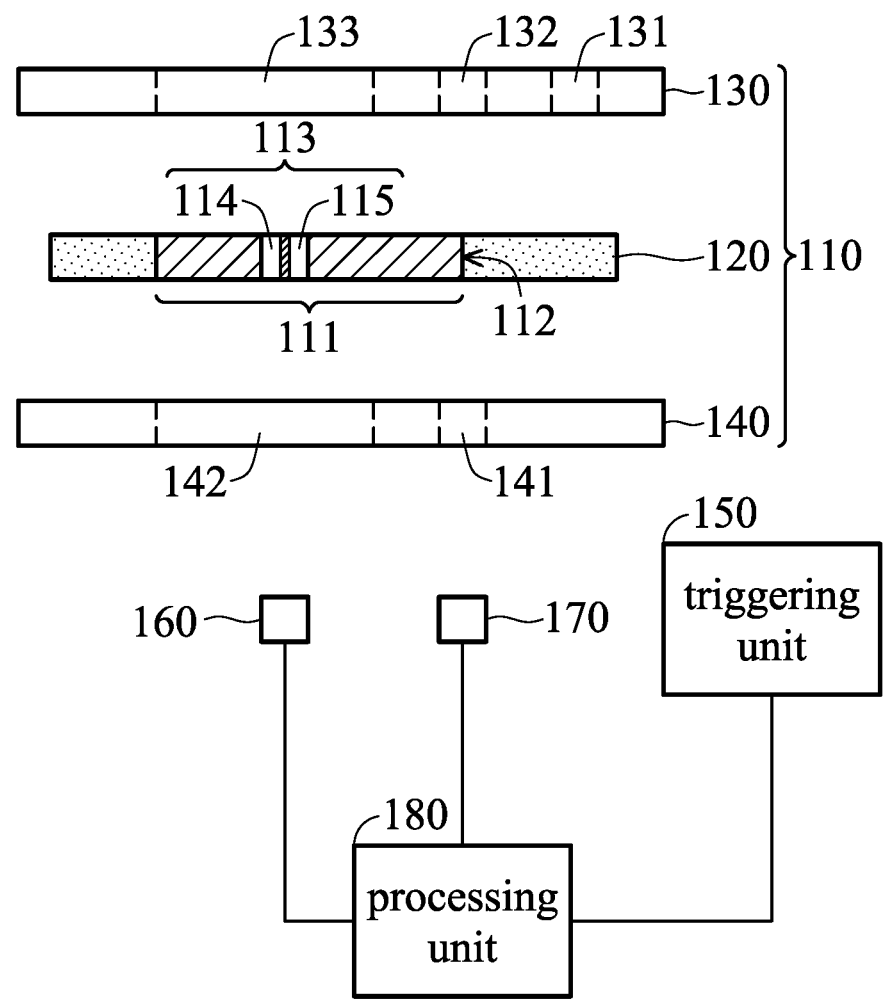
FIG. 1D shows a schematic view of a detection device with a compensation function according to yet another embodiment of the present invention.

In some embodiments, the light source 160 and the detecting unit 170 may be configured in a reflection manner, as shown in FIG. 1C or FIG. 1D, i.e. the light source 160 and the detecting unit 170 may be configured at the same side of the first cassette 110. When the light beam provided by the light source unit 160 illuminates on the reaction area 110 and reflects to the detecting unit 170, the detecting unit 170 generates the first light detecting signal and the second light detecting signal. In addition, the detecting unit 170 may be, for example, photodiode or other light receiving device.

Figure 1E:
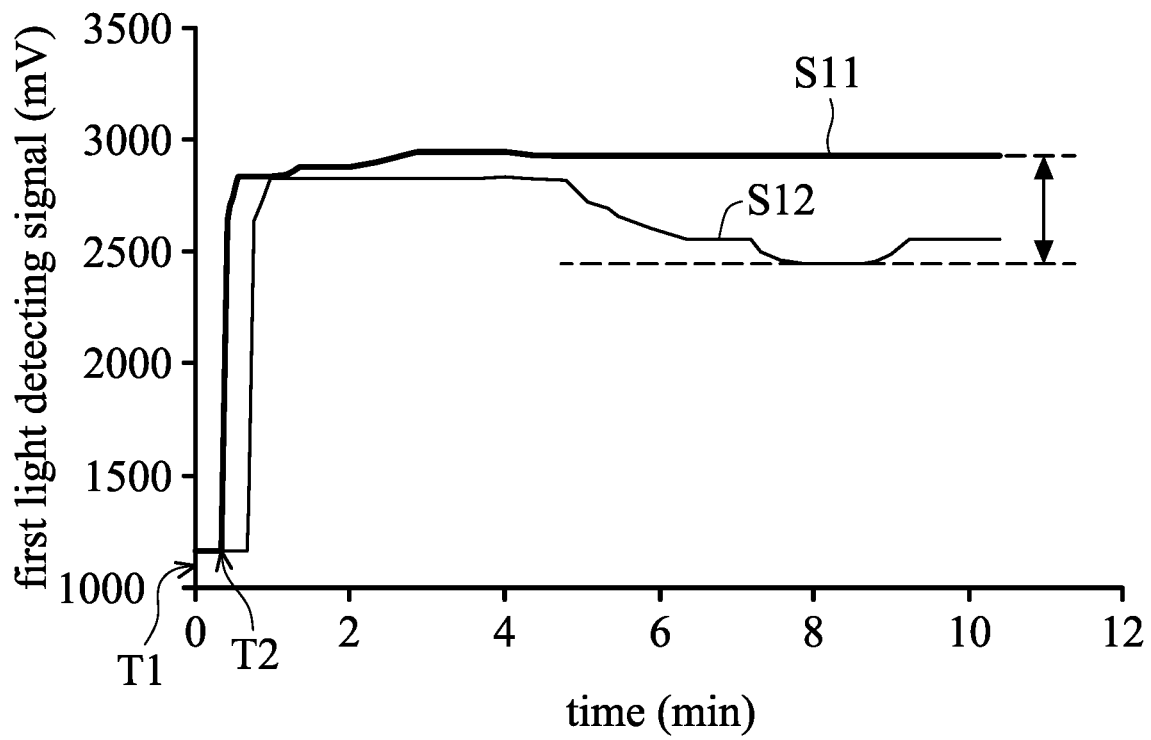
FIG. 1E shows a schematic view of a waveform of the first light detecting signal according to an embodiment of the present invention.

The processing unit 180 is coupled to the triggering unit 150, the light source unit 160 and the detecting unit 170, and receives the first triggering instruction, the first light detecting signal and the second light detecting signal. The processing unit 180 defines a first time point T1 (such as time point T1 shown in FIG. 1E) according to the first triggering instruction. When the first light detecting signal is greater than or equal to a predetermined value, the processing unit 180 defines a second time point T2 (such as time point T2 shown in FIG. 1E), and calculates the time difference between the first time point T1 and the second time point T2 and designates the time difference as a first retention time. That is, when the processing unit 180 receives the first light detecting signal, the processing unit 180 compares the first light detecting signal with the predetermined value, so as to determine whether the sample flows to the start position 112 of the reaction area. In the embodiment, the range of the predetermined value is, for example, 2500-2800 mV. The predetermined value may be adjusted according to different detection devices, cassettes or other environment states.

After the detection device 100 is started, the light source unit 160 and the detecting unit 170 are aligned with a predetermined position of the start position 112 of the first cassette 110. After the processing unit 180 receives the first triggering instruction to define the first time point T1, the detecting unit 170 may continue detecting the first light detecting signal at the start position 112. Since the sample does not flow to the start position 112 between the first time point T1 and the second time point T2, the nitrocellulose membrane of the start position 112 maintains dry and low light transmitting degree, the first light detecting signal detected by the detecting unit 170 is low, for example, about 1100-1200 mV. Accordingly, when the first light detecting signal is less than the predetermined value, it means that the first light detecting signal is not greatly increased, i.e. the transmitting degree of the start position 112 is not greatly increased, the processing unit 180 determines that the sample does not flow to the start position 112, the processing unit 180 does not define the second time point T2 and continue receiving the first light detecting signal.

When the first light detecting signal is greater than or equal to the predetermined value, it means that the first light detecting signal is greatly increased, i.e. the transmitting degree of the start position 112 is greatly increased, the processing unit 180 determines that the sample already flows to the start position 112 and define the second time point T2.

Then, the processing unit 180, for example, subtracts the second time point T2 from the first time point T1 (i.e., T2−T1) to obtain the first retention time, wherein the first retention time represents a time at which the sample is added to the first cassette 110 and flows to the start position 112 of the reaction area 111.

Afterward, the processing unit 180 may obtain a compensation value in a lookup table according to the first retention time and the second detecting signal and compensate for the second detecting signal by the compensation value. Therefore, the test data generated by the first cassette 110 is more accurate and the probability of false detection is decreased.

In the embodiment, the first cassette 110 includes a test strip 120, an upper cassette 130 and a lower cassette 140. The test strip 120 has the reaction area 111, the reaction area 111 has a color band 113, and the color band 113 has the test band 114 and the quality control band 115. The test strip is, for example, a lateral flow assay test strip.

The upper cassette 130 is disposed at a side of the test strip 120 and has a sample-adding opening 131, a first alignment hole 132 and a first detection window 133. The sample-adding opening 131 is used to add the sample. The first alignment hole 132 exposes the start position 112 of the reaction area 111, such that the light beam may be illuminated to the start position 112 from the first alignment hole 132. The first detection window 133 at least exposes the color band 113 of the reaction area 111. The first alignment hole 132 is disposed between the sample-adding opening 131 and the first detection window 133.

The lower cassette 140 disposed at another side of the test strip 120. In some embodiment, if in the detection device is a penetration type, the lower cassette 140 has a second alignment hole 141 and a second detection window 142, wherein a position of the second alignment hole 141 corresponds to a position of the first alignment hole 132 and a position of the second detection window 142 corresponds to a position of the first detection window 133. Accordingly, the light beam may be emitted from the first alignment hole 130 and penetrate the start position 112, and then pass through the second alignment hole 141 to the detecting unit 170.

In some embodiments, the light source unit 160 and the detecting unit 170 are disposed at a side of the upper cassette 130 opposite to the test strip 120, i.e. the light source unit 160 and the detecting unit 170 are at the same side, as shown in FIG. 1C. In the embodiment, the lower cassette 140 may not include the second alignment hole 141 and the second detection window 142.

In some embodiments, the light source unit 160 and the detecting unit 170 are disposed at a side of the lower cassette 140 opposite to the test strip 120, i.e. the light source unit 160 and the detecting unit 170 are at the same side, as shown in FIG. 1D. In the embodiment, the upper cassette 130 may not include the first alignment hole 132 and the first detection window 133.

In some embodiments, the light source unit 160 is configured at a side of the upper cassette 130 opposite to the test strip 120, and the detecting unit 170 is configured at a side of the lower cassette 140 opposite to the test strip 120, i.e. the light source unit 160 and the detecting unit 170 are respectively configured at two opposite sides, as shown in FIG. 1A and FIG. 1B.

In addition, the detection device with a compensation function 100 further includes a moving unit 190, as shown in FIG. 1A and FIG. 1B. The moving unit 190 is coupled to the light source unit 160, the detecting unit 170 and the processing unit 180. In some embodiments, When the detection device 100 is started and before the triggering instruction is generated, the processing unit 180 controls the moving unit 190 to move the light source unit 160 and the detecting unit 170 to places corresponding to the start position 112, such that the light beam of the light source unit 160 illuminates the start position 112 and the detecting unit 170 detect the light transmitting state of the start position 112 to generate the first detecting signal.

In the embodiment, after a predetermined time from the second time point T2, the processing unit 180 controls the detecting unit 170 to generate the second light detecting signal from the color band 113 of the reaction area 111. The predetermined time may be, for example, between five and twenty minutes, but it is not limited in the present invention. During the predetermined time, the analyte of the sample enters the reaction area 111 for an immune reaction to generate the color band. In the detection device with penetration type, after a predetermined time from the second time point T2, the processing unit 180 controls the moving unit 190 to make the light source unit 160 and the detecting unit 170 perform a relative-movement scan on the first cassette 110, so that the light beam of the light source 160 illuminates the reaction area 111 including the color band 113 and the detecting unit 170 detects the light transmitting state of the color band 113 to generate the second light detecting signal.

In some embodiments, the processing unit 180 waits for a predetermined time to control the moving unit 190, so as to move the light source unit 160 and the detecting unit 170 to places corresponding to the color band 113 and obtain the second light detecting signal.

In the embodiment, during the predetermined time from the second time point T2, the detecting unit 170 continues detecting the first light detecting signal at the start position 110 of the reaction area 111, and the processing unit 180 continues comparing the first light detecting signal with the predetermined value within the predetermined time, so as to monitor whether the sample in the first cassette 110 is abnormal. An abnormal sample, such as hemolysis generated in a blood sample, may cause inaccurate detection. If the sample has hemolysis, after the second time point T2, the light transmitting degree of the start position 112 is decreased and the first light detecting signal obtained is also decreased, as shown by curve S12. If the first light detecting signal is less than the predetermined value, the processing unit 180 may generate an abnormal message to the user, thereby stopping the subsequent operation of the detection device 100 or not adopting this second light detecting signal corresponding to the first light detecting signal.

Within the predetermined time, when the first light detecting signal is greater than or equal to the predetermined value continually, as shown by a curve S11 in FIG. 1D, it means that the sample is not abnormal, the processing unit 180 adopts the subsequent second light detecting signal corresponding to the first light detecting signal. That is, when the first light detecting signal indicates that the sample is not abnormal, the processing unit 180 may adopt the second light detecting signal corresponding to the first light detecting signal, search the compensation value in the lookup table according to the second light detecting signal and the corresponding first retention time, and compensate for the second light detecting signal by the compensation value.

Figure 1F:
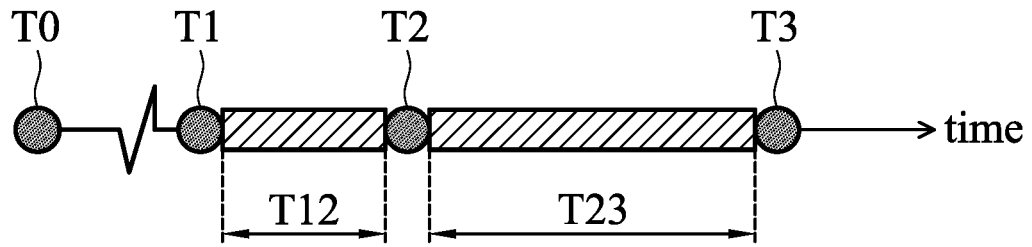
FIG. 1F shows a schematic view of an operation timing of the detection device with a compensation function according to an embodiment of the present invention.

FIG. 1F shows a schematic view of an operation timing of the detection device with a compensation function according to an embodiment of the present invention. Please refer to FIG. 1F, at time point T0, the first cassette 110 is placed to the detection device 100 and the detection device 100 is started. After the sample is added to the first cassette 110, the triggering unit 150 generates a first triggering instruction, such that the processing unit 180 defines the first time point (i.e., time point T1) according to a generating time of the first triggering instruction.

When the first light detecting signal generated by the detecting unit 170 is greater than predetermined value, the processing unit 180 defines the second time point (i.e., time point T2) according to the time of the first light detecting signal being greater than the predetermined value. The processing unit 180 uses the time between the first time point (i.e., time point T1) and the second time point (i.e., time point T2) as the first retention time T12.

At time point T3 after a predetermined time T23 from time point T2, the detecting unit 170 detects the reaction area 111 including the color band 113 to generate the second light detecting signal and the second light detecting signal is provided to the processing unit 180. The predetermined time is, for example, a reaction time of the sample in the reaction area 111 including the color band 113, and the time point T3 is a reaction end time of the sample.

Figure 2A:
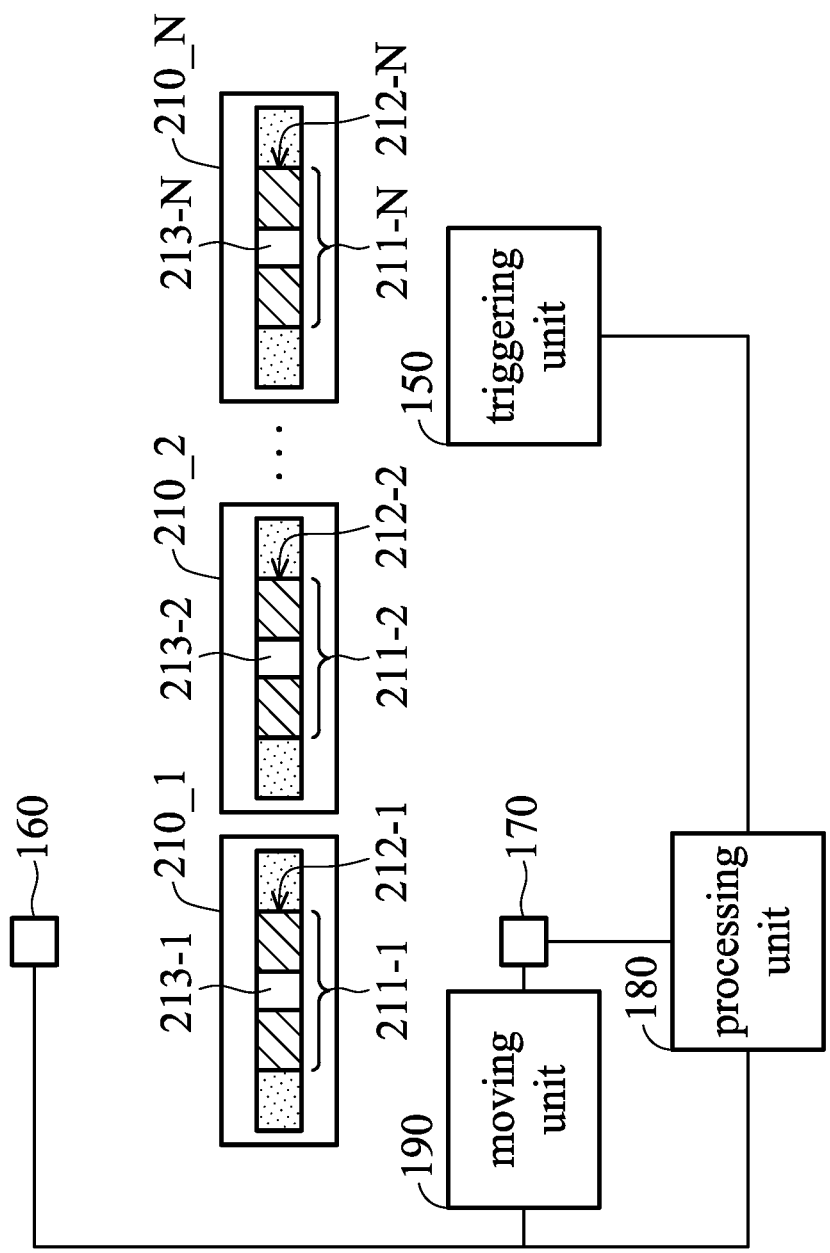
FIG. 2A shows a schematic view of a detection device with a compensation function according to another embodiment of the present invention.

Furthermore, to establish the lookup table, a plurality of cassettes may be used to detect through the standard sample. The detection device 100 with a compensation function further includes a plurality of second cassettes 210_1~210_N, wherein N is a positive integer greater than 1, as shown in FIG. 2A. The second cassettes 210_1~210_N are configured to accommodate samples, and the samples laterally flow in the second cassettes 210_1~210_N and flow to reaction areas 211_1~211_N of the second cassettes 210_1~210_N.

The second cassettes 210_1~210_N and the first cassette 110 are the same cassette. For example, the reaction areas 211_1~211_N and the reaction area 111 are the same, the start positions 212_1~212_N and the start position 112 are the same, and the color bands 213_1~213_N and the color band 1130 are the same. The structure of the second cassettes 210_1~210_N and the internal elements and configuration manner thereof are the same as the structure of the first cassette 110 and the internal elements and configuration manner thereof, which are described in the embodiments in FIG. 1A, FIG. 1B, FIG. 1C and FIG. 1D, and the description thereof is not repeated here. In addition, the description of the embodiment in FIG. 1F may be referred to for details of the operation timing of the second cassettes 210_1~210_N, and that description is not repeated here.

Furthermore, the triggering unit 150 further generates a plurality of second triggering instructions after the samples are added to the second cassettes 210_1~210_N. The light source unit 160 further provides a light beam to illuminate the start positions 212_1~212_N and the color bands 213_1~213_N of the reaction areas 211_1~211_N of the second cassettes 210_1~210_N.

The detecting unit 170 further detects the light transmitting state or the light reflecting state of the start positions 212_1~212_N and the color bands 213_1~213_N, so as to generate a plurality of third light detecting signals and a plurality of fourth light detecting signals. For example, when the samples flow to the start positions 212_1~212_N, the detecting unit 170 further detects the light transmitting state or the light reflecting state of the start positions 212_1~212_N, so as to generate the third light detecting signals. After the samples enter the reaction areas 211_1~211_N from the start positions 212_1~212_N for a predetermined time, the color bands 213_1~213_N are generated in the reaction areas 211_1~211_N, the detecting unit 170 further detects the color bands 213_1~213_N, so as to generate the fourth light detecting signals.

The processing unit 180 further receives the second triggering instructions to respectively define a plurality of third time points. The processing unit 180 further receives the third light detecting signals, defines a plurality of fourth time points when the third light detecting signals are greater than or equal to the predetermined value and calculates time differences between the third time points and the fourth time points and designates the time differences as a plurality of second retention times. That is, when the processing unit 180 receives the third light detecting signals, the processing unit 180 compares the third light detecting signals with the predetermined value, so as to determine whether the samples flow to the start positions 212_1~212_N.

For example, when the third light detecting signals are less than the predetermined value, it means that the third light detecting signals are not greatly increased, i.e. the transmitting degree of the start positions 212_1~212_N are not greatly increased, the processing unit 180 determines that the samples do not flow to the positions 212_1~212_N, the processing unit 180 does not define the fourth time points and continue receiving the third light detecting signal of the start positions 212_1~212_N.

When the third light detecting signals are greater than or equal to the predetermined value, it means that the third light detecting signals are greatly increased, i.e. the transmitting degree of the start positions 212_1~212_N are greatly increased, the processing unit 180 determines that the samples already flow to the start positions 212_1~212_N and define the fourth time points.

Then, the processing unit 180, for example, respectively subtracts the fourth time points from the third time points to obtain a plurality of second retention times, wherein the second retention times represent a period for which the samples flow from the sample-adding openings to the start positions 212_1~212_N of the reaction areas 211_1~211_N.

Afterward, the processing unit 180 may calculate slopes and intercepts of a plurality of compensation curves to establish the lookup table according to the second retention times and the signal values of the fourth detecting signals. Therefore, the processing unit 180 may find the corresponding compensation value according to the slopes and intercepts of the compensation curves of the lookup table, and compensate for the signal value of the second light detecting signal corresponding to the first cassette 110 by the compensation value, such that the test data generated by the first cassette 110 is more accurate and the probability of false detection is decreased.

In addition, after the processing unit 180 obtains the above fourth light detecting signals, the processing unit 180 may calculate the average value according to the fourth light detecting signal. For example, the processing unit 180 adds the signal values of N fourth light detecting signals to obtain a total value and divides the total value by the number N of the fourth light sensing signals to calculate the average value.

Figure 2B:
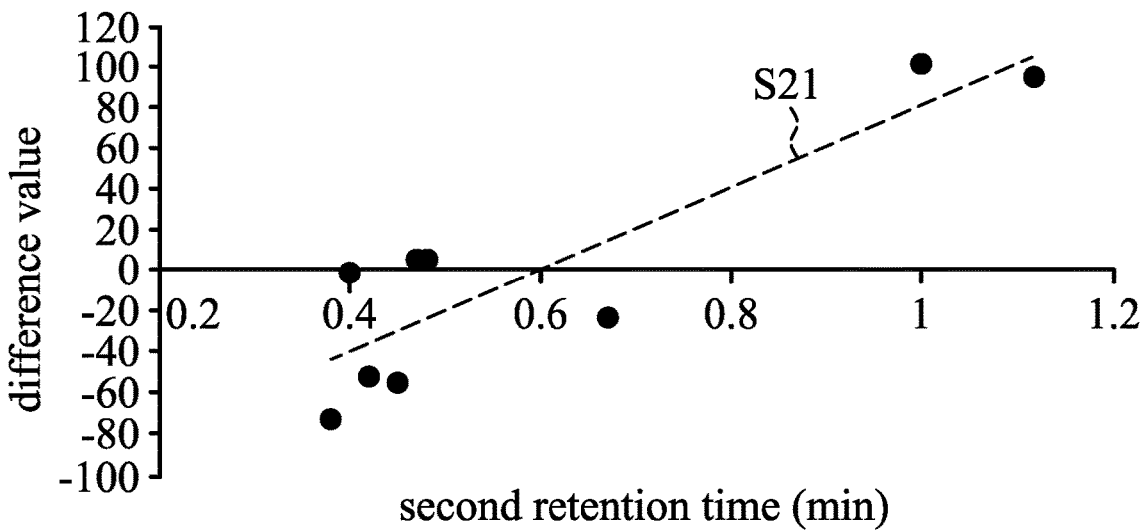
FIG. 2B shows a schematic view of a corresponding relationship between difference values and the second retention times according to another embodiment of the present invention.

Afterward, the processing unit 180 may generate a plurality of difference values according to the fourth light detecting signals and the average values. For example, the processing unit subtracts the average value from the signal values of the fourth light detecting signals to generate the above difference values. Then, the processing unit 180 may generates a compensation curve according to the corresponding relationship of the difference values and the second retention times, as shown in FIG. 2B. For example, the processing unit 180 performs a calculation of linear regression for the difference values and the second retention times, so as to generate the compensation curve y=ax+b. The processing unit 180 uses the slopes and intercepts of the compensation curve to establish the lookup table. In some embodiments, the processing unit 180 divides the average value from the fourth light sensing signals, respectively, so as to generate the difference coefficients. Then, the processing unit 180 may generate another compensation curve according to the corresponding relationship of the above different coefficients and the second retention times, so as to establish the lookup table.

In one embodiment, when the detection device 100 is started, before the second triggering instructions are generated, the processing unit 180 further control the moving unit 190 to move the light source unit 160 and the detecting unit 170 to places corresponding to the start positions 212_1~212_N, such that the light beam illuminates the start positions 212_1~212_N and the light transmitting states of the start positions 212_1~212_N are detected to generate the third light detecting signals.

After a predetermined time from the fourth time points, the processing unit 180 further control the moving unit 190 to move the light source unit 160 and the detecting unit 170 to places corresponding to the color bands 213_1~213_N, such that the light beam illuminates the color bands 213_1~213_N and the light transmitting states of the color bands 213_1~213_N are detected to generate the fourth light detecting signals. The predetermined time is, for example, five to twenty minutes, but not limited to the present invention.

That is, when the processing unit 180 defines the fourth time points, the processing unit 180 may wait a predetermined time to control the moving unit 190 to move the light source unit 160 and the detecting unit 170 to places corresponding to the color bands 213_1~213_N, so as to obtain the fourth light detecting signals.

Furthermore, in the embodiment, within the predetermined time from the fourth time pointes, the processing unit 180 continue comparing the third light detecting signals of the start positions 212_1~212_N with the predetermined value, so as to determine whether the sample in the second cassettes 212_1~212_N are abnormal, such as abnormal sample or contamination. When any one of the third light detecting signals is less than the predetermined value, the processing unit 180 generates an abnormal message, it means that the sample is abnormal, i.e. the light transmitting degrees of the color bands 213_1~213_N are also abnormal. Accordingly, the fourth detecting signal corresponding to the third light detecting signal is not adopted, so as to avoid affecting the establishment of the compensation curve of the lookup table.

Within the predetermined time, when the third light detecting signals are greater than or equal to the predetermined value continually, it means that the sample is not abnormal, the processing unit 180 adopts the subsequent fourth light detecting signals corresponding to the third light detecting signals. Afterward, the processing unit 180 may use these fourth light detecting signals as a basis for generating the compensation curves and establishing the lookup table. Accordingly, the third light detecting signals obtained from the start positions may be used as background signals to monitor the state of the sample.

Table 1 is a corresponding relationship table of the second retention times, the fourth light detecting signals, the average value, the difference values and the difference coefficients under the second cassettes using the samples with the same concentration C1. In Table 1, it can be seen that the samples with the same concentration are used to detect ten second cassettes 210_1~210_10. Table 1 does not appear the test result of the second cassette 210_7, it means that the sample of the second cassette 210_7 is abnormal, such that the test data of the second cassette 210_7 is not adopted by the processing unit 180, so as to avoid inaccurate compensation values generated.

The signal values of the fourth light detecting signals corresponding to the second cassettes 210_1~210_6 and 210_8~210_10 are added to obtain a total value, and then the total value is divided by the number (i.e., 9) of the second cassettes to calculate the average value (i.e., 315). Afterward, the average value is subtracted from the signal values of the fourth light detecting signals corresponding to the second cassettes 210_1~210_6 and 210_8~210_10, so as to generate the difference values corresponding to the second cassettes 210_1~210_6 and 210_8~210_10. In some embodiment, the average value is divided by the signal values of the fourth light detecting signals corresponding to the second cassettes 210_1~210_6 and 210_8~210_10, so as to generate the different coefficients corresponding to the second cassettes 210_1~210_6 and 210_8~210_10.

Figure 2C:
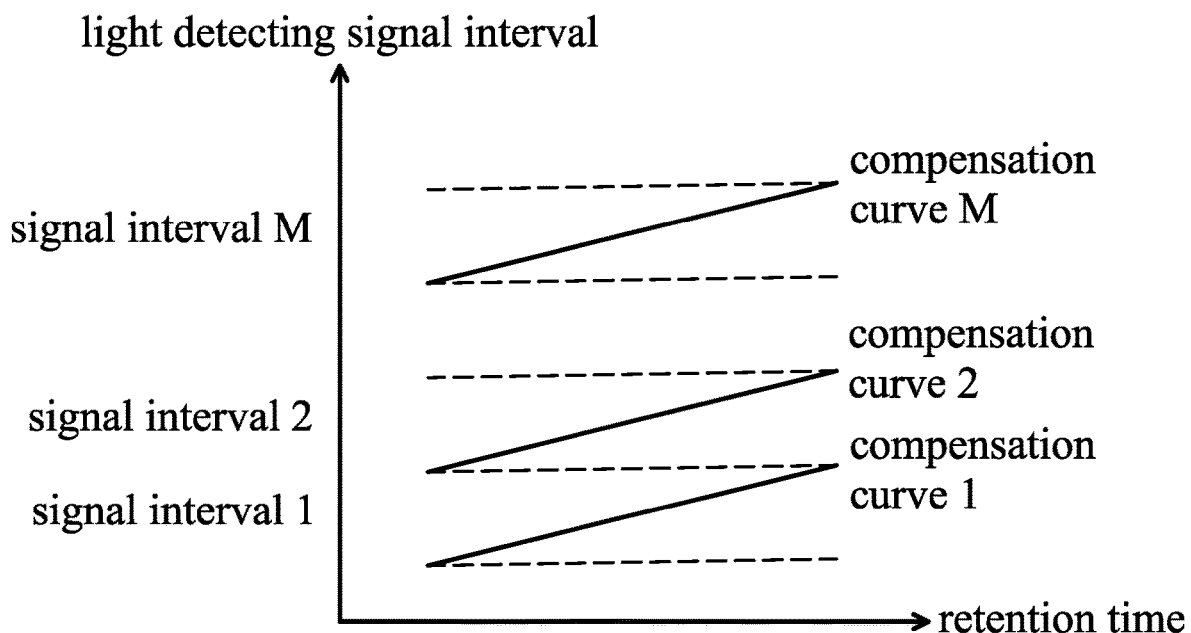
FIG. 2C shows a schematic view of a corresponding relationship among light detecting signal area, slopes of the compensation curve and the intercepts of the compensation curve according to another embodiment of the present invention.

Afterward, the calculation of linear regression is performed for the difference values corresponding to the second cassettes 210_1~210_6 and 210_8~210_10 and the second retention times, so as to obtain one set of slope a1 and intercept b1 of compensation curve 1 in the signal interval 1, as shown in Table 2 and FIG. 2C. In some embodiments, the calculation of linear regression is also performed for the difference coefficients corresponding to the second cassettes 210_1~210_6 and 210_8~210_10 and the second retention times, so as to obtain another slope and intercept in the signal interval 1. Table 1 represents corresponding relationship of the second cassettes, the second retention times, the fourth detecting signals, the average value, the difference values and the difference coefficients

| number | 210_1 | 210_2 | 210_3 | 210_4 | 210_5 | 210_6 | 210_8 | 210_9 | 210_10 | average value |
|---|---|---|---|---|---|---|---|---|---|---|
| second retention time (min) | 0.4 | 0.48 | 0.42 | 0.38 | 0.67 | 0.47 | 1 | 1.12 | 0.45 | 0.6 |
| fourth light detecting signal | 314 | 320 | 263 | 242 | 292 | 320 | 416 | 408 | 260 | 315.00 |
| difference value | −1 | 5 | −52 | −73 | −23 | 5 | 101 | 93 | −55 | |
| difference coefficient | 1.003 | 0.984 | 1.198 | 1.302 | 1.079 | 0.984 | 0.757 | 0.772 | 1.212 | |

In above embodiment, the samples added to the second cassettes 210_1~210_10 are the samples with the same concentration and the slope a1 and intercept b1 of the signal interval 1 are obtained. Then, samples with another concentration C2 are added to the second cassettes 210_11~210_20 for detecting. Refer to the description of the above embodiment for details of the operation, such that one set of slope a2 and intercept b2 of compensation curve 2 of the signal interval 2 are obtained. In other words, the above operation is performed on samples with different concentrations C1~CM, so as to generate M set of slopes aM and intercepts bM of the compensation curves M. Accordingly, the lookup table is established as shown in Table 2, and Table 2 is a corresponding relationship of the signal intervals 1~M of the light detecting signal and the slopes and intercepts of the compensation curves.

When the sample with unknown concentration is added to the first cassette for detecting, the processing unit obtains a first retention time and a second light detecting signal, and determines that the second light detecting signal thereof belongs to some signal interval in the lookup table. According to the slope and intercept of the signal interval thereof, the processing unit substitutes the first retention time to the compensation curve corresponding the slope and intercept of the signal interval thereof to calculate, so as to obtain the compensation value for compensating the second light detecting signal.

| light detecting signal interval | slope of compensation curve | intercept of compensation curve |
|---|---|---|
| signal interval 1 | slope a1 | intercept b1 |
| signal interval 2 | slope a2 | intercept b2 |
| . | . | . |
| . | . | . |
| . | . | . |
| signal interval M | slope aM | intercept aM |

In the embodiment, the lookup table is established according to the linear regression performed for the difference values and the second retention times. The compensation value is calculated and obtained according to the lookup table, and the compensation value is subtracted from the second light detecting signal to obtain the compensated light detecting signal, so as to approximate the true concentration of the analyte. In some embodiments, the lookup table is established according to the linear regression performed for the difference coefficients and the second retention times. The compensation value is calculated and obtained according to the lookup table, and the compensation value is multiplied by the second light detecting signal to obtain the compensated light detecting signal, so as to approximate the true concentration of the analyte.

Figure 3:
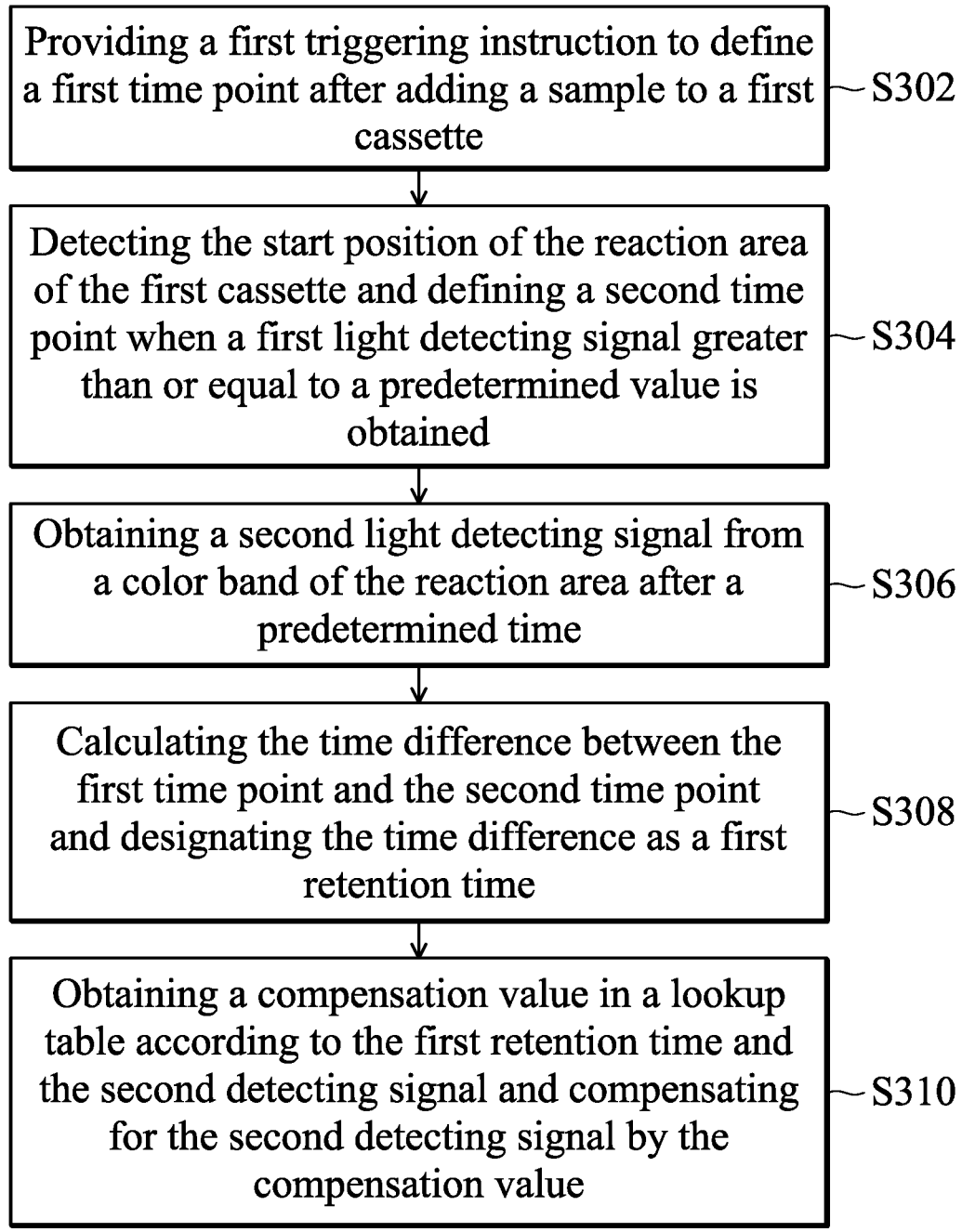
FIG. 3 shows a flowchart of a detection method with a compensation function according to an embodiment of the present invention.

According to the above-mentioned description, the above embodiments may combine a detection method with a compensation function. FIG. 3 shows a flowchart of a detection method with a compensation function according to an embodiment of the present invention.

In step S302, the method involves providing a first triggering instruction to define a first time point after adding a sample to a first cassette. In step S304, the method involves detecting the start position of the reaction area of the first cassette and defining a second time point when a first light detecting signal greater than or equal to a predetermined value is obtained.

In step S306, the method involves obtaining a second light detecting signal from a color band of the reaction area after a predetermined time. In step S308, the method involves calculating the time difference between the first time point and the second time point and designating the time difference as a first retention time. In step S310, the method involves obtaining a compensation value in a lookup table according to the first retention time and the second detecting signal and compensating for the second detecting signal by the compensation value.

Figure 4:
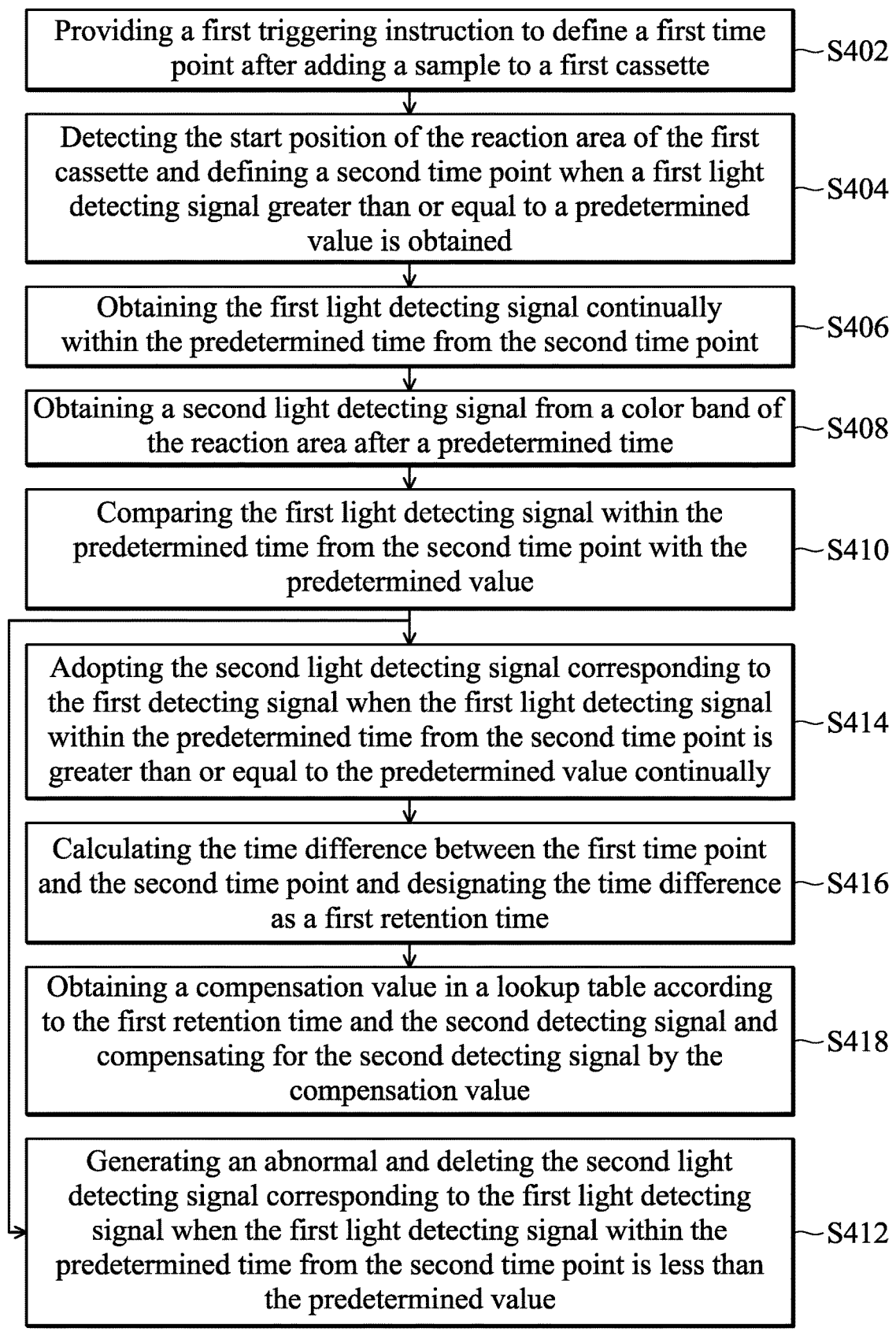
FIG. 4 shows a flowchart of a detection method with a compensation function according to another embodiment of the present invention.

FIG. 4 shows a flowchart of a detection method with a compensation function according to another embodiment of the present invention. In step S402, the method involves providing a first triggering instruction to define a first time point after adding a sample to a first cassette. In step S404, the method involves detecting the start position of the reaction area of the first cassette and defining a second time point when a first light detecting signal greater than or equal to a predetermined value is obtained.

In step S406, the method involves obtaining the first light detecting signal continually within the predetermined time from the second time point. In step S408, the method involves obtaining a second light detecting signal from a color band of the reaction area after a predetermined time. In step S410, the method involves comparing the first light detecting signal within the predetermined time from the second time point with the predetermined value. In step S412, the method involves generating an abnormal and deleting the second light detecting signal corresponding to the first light detecting signal when the first light detecting signal within the predetermined time from the second time point is less than the predetermined value.

In step S414, the method involves adopting the second light detecting signal corresponding to the first detecting signal when the first light detecting signal within the predetermined time from the second time point is greater than or equal to the predetermined value continually. In step S416, the method involves calculating the time difference between the first time point and the second time point and designating the time difference as a first retention time.

In step S418, the method involves obtaining a compensation value in a lookup table according to the first retention time and the second detecting signal and compensatinge for the second detecting signal by the compensation value.

Figure 5:
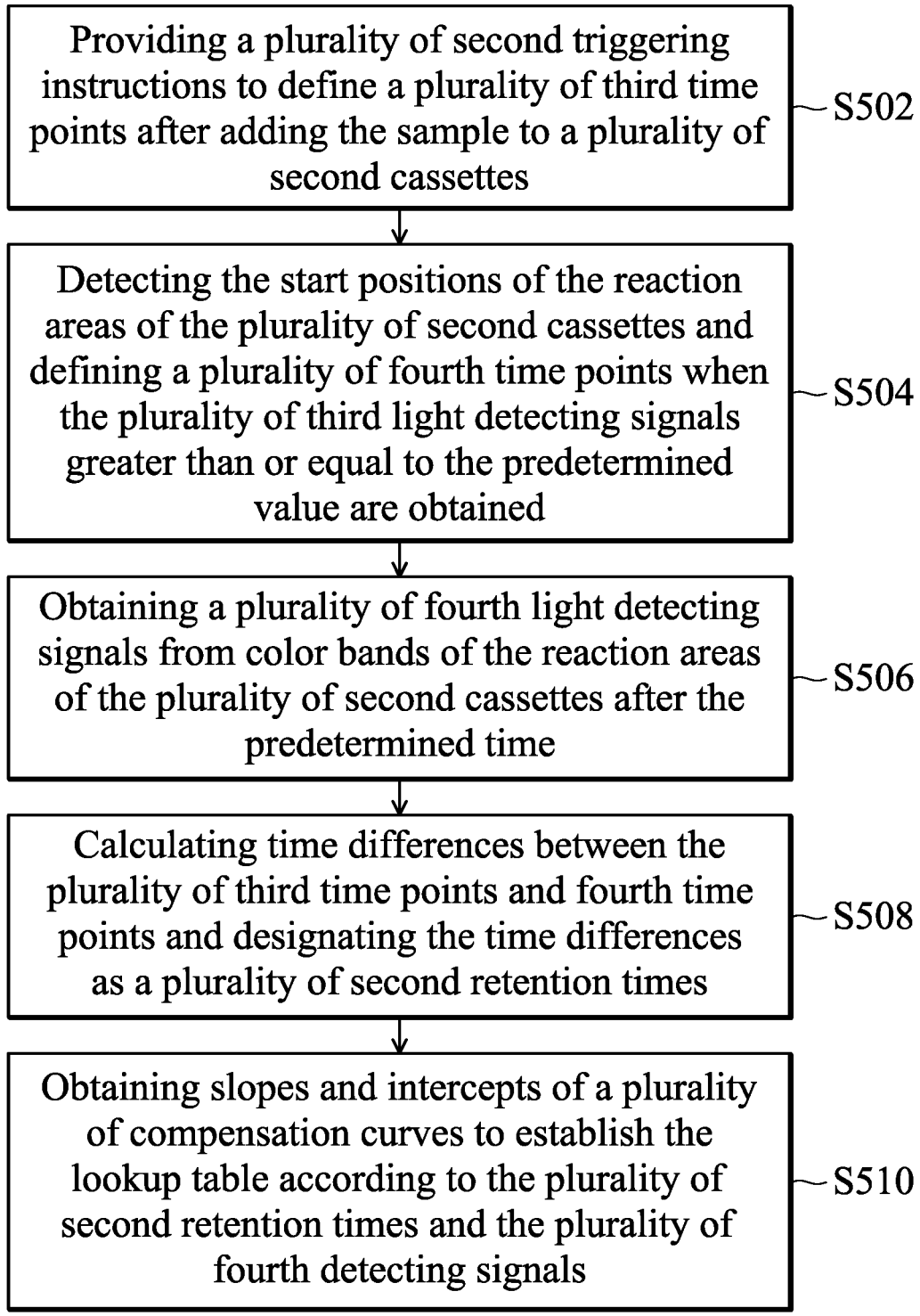
FIG. 5 shows a flowchart of a detection method with a compensation function according to yet another embodiment of the present invention.

FIG. 5 shows a flowchart of a detection method with a compensation function according to yet another embodiment of the present invention. In step S502, the method involves providing a plurality of second triggering instructions to define a plurality of third time points after adding the sample to a plurality of second cassettes. In step S504, the method involves detecting the start position of the reaction area of the plurality of second cassettes and defining a plurality of fourth time points when the plurality of third light detecting signals greater than or equal to the predetermined value are obtained.

In step S506, the method involves obtaining a plurality of fourth light detecting signals from a color band of the reaction area of the plurality of second cassettes after the predetermined time. In step S508, the method involves calculating time differences between the plurality of third time points and fourth time points and designating the time differences as a plurality of second retention times.

In step S510, the method involves obtaining slopes and intercepts of a plurality of compensation curves to establish the lookup table according to the plurality of second retention times and the plurality of fourth detecting signals. That is, FIG. 5 may be a flow for establishing the lookup table. Then, after step S510 is performed, the flow may be entered to step S302 in FIG. 3 and the flow of FIG. 3 is performed.

Figure 6:
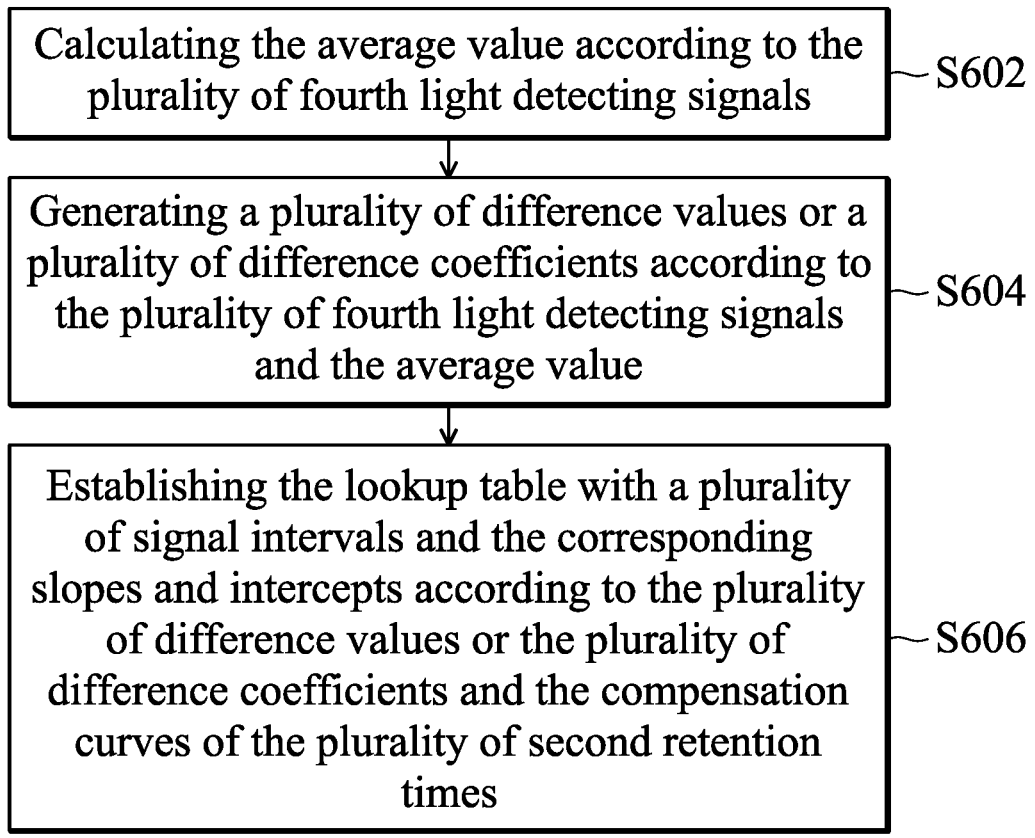
FIG. 6 shows a detailed flowchart of step S510 in FIG. 5.

FIG. 6 shows a detailed flowchart of step S510 in FIG. 5. In step S602, the method involves calculating the average value according to the plurality of fourth light detecting signals. In step S604, the method involves generating a plurality of difference values or a plurality of difference coefficients according to the plurality of fourth light detecting signals and the average value. In step S606, the method involves establishing the lookup table with a plurality of signal intervals and the corresponding slopes and intercepts according to the plurality of difference values or the plurality of difference coefficients and the compensation curves of the plurality of second retention times.

Figure 7A:
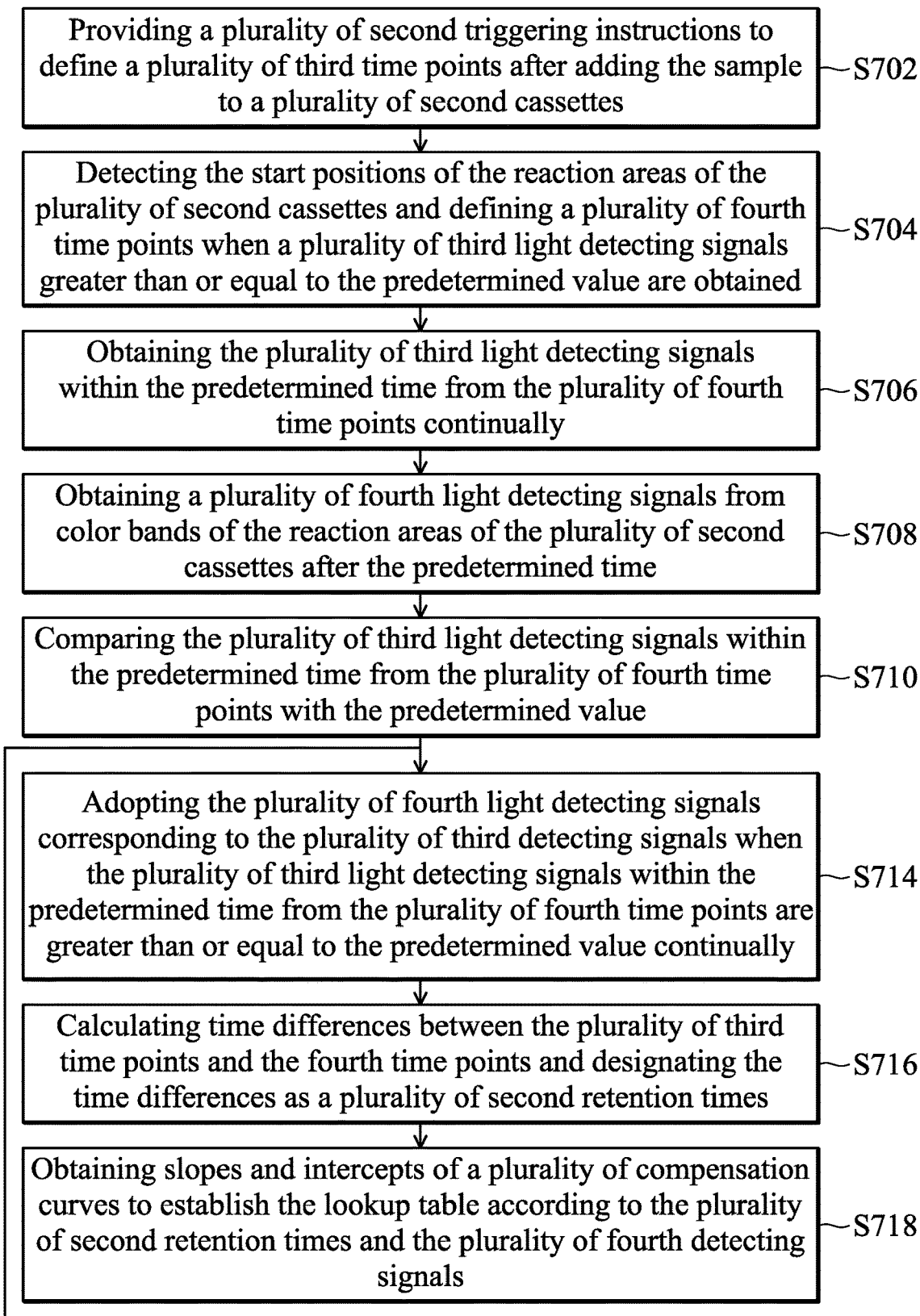
FIGS. 7A~7B show flowcharts of a detection method with a compensation function according to yet another embodiment of the present invention.
Figure 7B:

FIGS. 7A~7B show flowcharts of a detection method with a compensation function according to yet another embodiment of the present invention. In step S702, the method involves providing a plurality of second triggering instructions to define a plurality of third time points after adding the sample to a plurality of second cassettes. In step S704, the method involves detecting the start positions of the reaction areas of the plurality of second cassettes and defining a plurality of fourth time points when a plurality of third light detecting signals greater than or equal to the predetermined value are obtained.

In step S706, the method involves obtaining the plurality of third light detecting signals within the predetermined time from the plurality of fourth time points continually. In step S708, the method involves obtaining a plurality of fourth light detecting signals from color bands of the reaction areas of the plurality of second cassettes after the predetermined time.

In step S710, the method involves comparing the plurality of third light detecting signals within the predetermined time from the plurality of fourth time points with the predetermined value. In step S712, the method involves when any one of the plurality of third light detecting signals within the predetermined time from the plurality of fourth time points is less than the predetermined value, generating an abnormal message and deleting one of the fourth light detecting signals corresponding to the one of the third light detecting signals.

In step S714, the method involves adopting the plurality of fourth light detecting signals corresponding to the plurality of third detecting signals when the plurality of third light detecting signals within the predetermined time from the plurality of fourth time points are greater than or equal to the predetermined value continually. In step S716, the method involves calculating time differences between the plurality of third time points and the fourth time points and designating the time differences as a plurality of second retention times. In step S718, the method involves obtaining slopes and intercepts of a plurality of compensation curves to establish the lookup table according to the plurality of second retention times and the plurality of fourth detecting signals.

In summary, according to the detection method and detection device with a compensation function, a sample is added to the first cassette, and the start position and the color band of the reaction area of the first cassette are detected to generate a first light detecting signal and a second light detecting signal, respectively. Then, the first time pointed is defined according to the first triggering instruction and the second time point is defined when the first light detecting signal is greater than or equal to the predetermined value, and the time difference between the first time point and the second time point is calculated and the time difference is designated as the first retention time. Afterward, the corresponding compensation value is obtained in the lookup table according to the first retention time and the second light detecting signal, so as to compensate for the second light detecting signal. In addition, the above detection method may be further performed for the second cassettes, so as to generate slopes and intercepts of the compensation curves, and the slopes and intercepts of the compensation curves are used to establish the above lookup table. Therefore, the test data generated by the first cassette is more accurate and the probability of false detection is decreased.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A detection method with a compensation function, comprising
   (a) receiving a first triggering instruction to define a first time point, wherein the first triggering instruction is generated by a triggering unit after adding a sample to a first cassette;
   (b) detecting a start position of a reaction area of the first cassette to generate a first light detecting signal when the sample flows to the start position and defining a second time point when receiving the first light detecting signal greater than or equal to a predetermined value;
   (c) obtaining a second light detecting signal from a color band of the reaction area after a predetermined time;
   (d) calculating a time difference between the first time point and the second time point and designating the time difference as a first retention time; and
   (e) obtaining a compensation value in a lookup table according to the first retention time and the second detecting signal and compensating the second detecting signal by the compensation value.

2. The detection method with a compensation function as claimed in claim 1, wherein the detection method between step (b) and step (c) further comprises:
   obtaining the first light detecting signal continually within the predetermined time from the second time point; and wherein the detection method between step (c) and step (d) further comprises:
comparing the first light detecting signal within the predetermined time from the second time point with the predetermined value;
generating an abnormal message when the first light detecting signal within the predetermined time from the second time point is less than the predetermined value; and
determining that the second light detecting signal is acceptable and further compensated by the compensation value when the first light detecting signal within the predetermined time from the second time point is greater than or equal to the predetermined value continually.

3. The detection method with a compensation function as claimed in claim 1, further comprising:
(f) receiving a plurality of second triggering instructions to define a plurality of third time points, wherein the plurality of second triggering instructions are generated by the triggering unit after adding samples to a plurality of second cassettes;
(g) detecting start positions of reaction areas of the plurality of second cassettes to generate a plurality of third light detecting signals when the samples flow to the start positions and defining a plurality of fourth time points when receiving the plurality of third light detecting signals greater than or equal to the predetermined value;
(h) obtaining a plurality of fourth light detecting signals from color bands of the reaction areas of the plurality of second cassettes after the predetermined time;
(i) calculating time differences between the plurality of third time points and fourth time points and designating the time differences as a plurality of second retention times; and
(j) performing a calculation of linear regression for the plurality of second retention times and the plurality of fourth light detecting signals to obtain slopes and intercepts of a plurality of compensation curves, so as to establish the lookup table.

4. The detection method with a compensation function as claimed in claim 3, wherein step (j) comprises:
calculating an average value to of the plurality of fourth light detecting signals;
generating a plurality of difference values or a plurality of difference coefficients from differences between the plurality of fourth light detecting signals and the average value; and
performing the calculation of linear regression for the plurality of difference values or the plurality of difference coefficients and the plurality of second retention times to establish the lookup table with a plurality of signal intervals and the corresponding slopes and intercepts of the compensation curves.

5. The detection method with a compensation function as claimed in claim 4, wherein the detection method between step (g) and step (h) further comprises:
obtaining the plurality of third light detecting signals within the predetermined time from the plurality of fourth time points continually; and
wherein the detection method between step (h) and step (i) further comprises:
comparing the plurality of third light detecting signals within the predetermined time from the plurality of fourth time points with the predetermined value;

when any one of the plurality of third light detecting signals within the predetermined time from the plurality of fourth time points is less than the predetermined value, generating an abnormal message and deleting one of the fourth light detecting signals which corresponds to the one of the third light detecting signals which is less than the predetermined value; and
determining that the plurality of fourth light detecting signals corresponding to the plurality of third light detecting signals are acceptable as a basis for generating the compensation curves and establishing the lookup table when the plurality of third light detecting signals within the predetermined time from the plurality of fourth time points are greater than or equal to the predetermined value continually.

6. A detection device with a compensation function, comprising:
a first cassette, configured to accommodate a sample, such that the sample laterally flows to a reaction area of the first cassette;
a triggering unit, configured to generate a first triggering instruction after the sample is added to the first cassette;
a light source unit, configured to provide a light beam for illuminating the reaction area;
a detecting unit, configured to correspond to the reaction area, wherein the detecting unit is configured to detect a start position of the reaction area to generate a first light detecting signal when the sample flows to the start position, and the detecting unit is configured to detect a color band to generate a second light detecting signal after the sample flows into the reaction area from the start position for a predetermined time and the color band is generated in the reaction area; and
a processing unit, coupled to the triggering unit, the light source unit and the detecting unit, wherein the processing unit is configured to define a first time point when receiving the first triggering instruction, the processing unit is configured to define a second time point when receiving the first light detecting signal greater than or equal to a predetermined value, and to calculate a time difference between the first time point and the second time point and designate the time difference as a first retention time, and the processing unit is configured to receive the second light detecting signal, obtain a compensation value in a lookup table according to the first retention time and the second light detecting signal and compensate the second light detecting signal by the compensation value.

7. The detection device with a compensation function as claimed in claim 6, wherein the processing unit is further configured to compare the first light detecting signal with the predetermined value and generate an abnormal message when the first light detecting signal is less than the predetermined value.

8. The detection device with a compensation function as claimed in claim 6, wherein the first cassette comprises:
a test strip, having the reaction area, wherein the reaction area has a color band;
an upper cassette, disposed at a side of the test strip and having a sample-adding opening, a first alignment hole and a first detection window, wherein the sample-adding opening is used to add the sample, the first alignment hole exposes the start position of the reaction area, the first detection window corresponds to the reaction area having the color band, and the first alignment hole is disposed between the sample-adding opening and the first detection window; and a lower cassette, disposed at another side of the test strip and having a second alignment hole and a second detection window, wherein the second alignment hole corresponds to the first alignment hole and the second detection window corresponds to the first detection window.

9. The detection device with a compensation function as claimed in claim 8, wherein the light source unit and the detecting unit are disposed at a side of the upper cassette opposite to the test strip or a side of the lower cassette opposite to the test strip.

10. The detection device with a compensation function as claimed in claim 8, wherein the light source unit is disposed at a side of the upper cassette opposite to the test strip and the detecting unit is disposed at a side of the lower cassette opposite to the test strip.

11. The detection device with a compensation function as claimed in claim 6, further comprising:
a moving unit, coupled to the light source unit, the detecting unit and the processing unit;
wherein before receiving the first triggering instruction, the processing unit is configured to control the moving unit to move the light source unit and the detecting unit to places corresponding to the start position, such that the light beam of the light source unit illuminates the start position and the detecting unit detects the start position to generate the first light detecting signal; and
wherein after the predetermined time from the second time point, the processing unit is configured to control the moving unit to move the light source unit and the detecting unit to places corresponding to the color band, such that the light beam of the light source at least illuminates the color band and the detecting unit detects the color band to generate the second light detecting signal.

12. The detection device with a compensation function as claimed in claim 6, further comprising:
a plurality of second cassettes, configured to accommodate samples, such that the samples laterally flow to reaction areas of the plurality of second cassettes;
wherein the triggering unit is further configured to generate a plurality of second triggering instructions after the samples are added to the plurality of second cassettes;
wherein the light source unit is further configured to provide a light beam to illuminate the reaction areas of the plurality of second cassettes;
wherein when the samples flow to start positions of the reaction areas of the plurality of second cassettes, the detecting unit is further configured to detect the start positions of the reaction areas of the plurality of second cassettes to generate a plurality of third light detecting signals, and after the samples flow to the reaction areas of the plurality of second cassettes from the start positions of the reaction areas of the plurality of second cassettes for a predetermined time, color bands are generated in the reaction areas of the plurality of second cassettes, the detecting unit is further configured to detect the color bands of the reaction areas to generate a plurality of fourth light detecting signals;
wherein the processing unit is further configured to receive the plurality of second triggering instructions to define a plurality of third time points, the processing unit is further configured to receive the plurality of third light detecting signals, define a plurality of fourth time points when the plurality of third light detecting signals are greater than or equal to the predetermined value and calculate time differences between the plurality of third time points and the plurality of fourth time points and designate the time differences as a plurality of second retention times, and the processing unit is further configured to receive the plurality of fourth light detecting signals and perform a calculation of linear regression for the plurality of second retention times and the plurality of fourth light detecting signals to calculate slopes and intercepts of a plurality of compensation curves, so as to establish the lookup table.

13. The detection device with a compensation function as claimed in claim 12, wherein the processing unit is further configured to calculate an average value of the plurality of fourth light detecting signals, generates a plurality of difference values or a plurality of difference coefficients from differences between the plurality of fourth light detecting signals and the average value, and perform the calculation of linear regression for the plurality of difference values or the plurality of difference coefficients and the plurality of second retention times to establish the lookup table with a plurality of signal intervals and the corresponding slopes and intercepts of the compensation curves.

* * * * *